C. S. BARRELL.
TIRE CHAIN.
APPLICATION FILED MAR. 24, 1920.
1,358,815.
Patented Nov. 16, 1920.
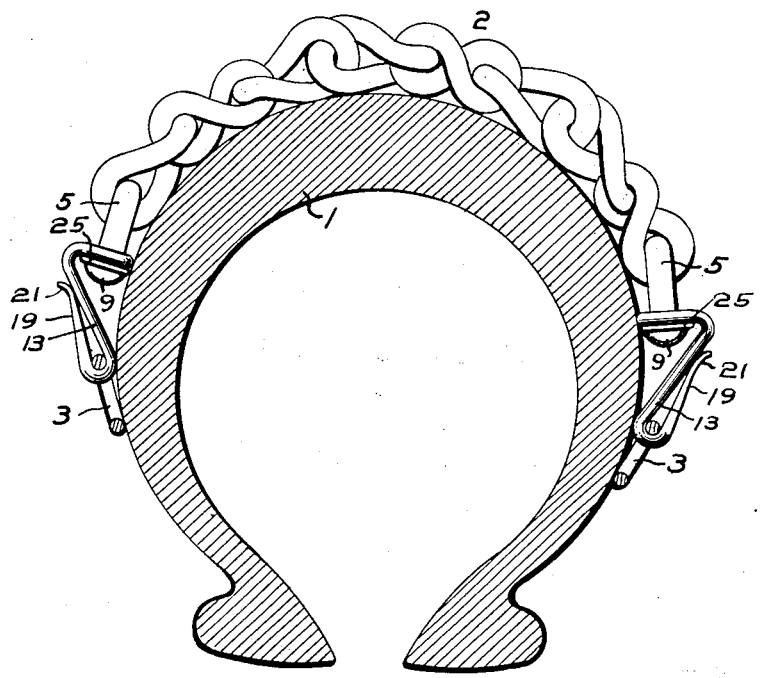
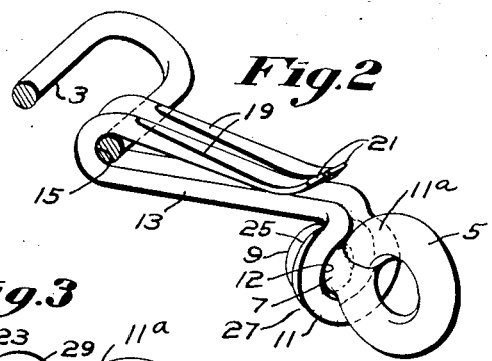
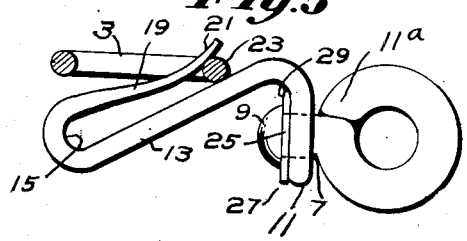
Inventor:
Charles S. Barrell
By Robt. D. Harris
Attorney

UNITED STATES PATENT OFFICE.

CHARLES S. BARRELL, OF BOSTON, MASSACHUSETTS, ASSIGNOR TO BARRELL HOLDING AND MANUFACTURING COMPANY.

TIRE-CHAIN.

1,358,815. Specification of Letters Patent. Patented Nov. 16, 1920.

Application filed March 24, 1920. Serial No. 368,206.

*To all whom it may concern:*

Be it known that I, CHARLES S. BARRELL, a citizen of the United States, residing at Boston, in the county of Suffolk and State of Massachusetts, have invented an Improvement in Tire-Chains, of which the following description, in connection with the accompanying drawings, is a specification, like characters on the drawings representing like parts.

The invention to be hereinafter described relates to securing members for tire chains and other purposes, and more particularly to securing members for readily detachably connecting the ends of the cross members or chains to the circular side members or chains of tire chains.

In the use of tire chains, the cross chains become worn and frequently break, and it is necessary to substitute new cross chains therefor. It is difficult and inconvenient to remove the loose end or ends of the broken cross chain from the side chains, and the nature of the connection of the ends of the cross chains with the side chains is such that a tool or tools must be employed to disconnect the ends of the cross chain from the side chains, and to effect the connection of the ends of a new cross chain with the side chains.

One of the purposes of the present invention is to provide simple and efficient means whereby the cross chains may be quickly and easily connected to the side chains without the use of tools and without the necessity of employing a skilled mechanic.

The character of the invention may be best understood by reference to the following description of one good form thereof shown in the accompanying drawing, wherein:

Figure 1 is a transverse section through a tire showing a cross chain and one good form of means for detachably connecting the ends of the cross chain to the side chains;

Fig. 2 on an enlarged scale is a perspective view of one of the devices for detachably connecting the ends of the cross chain with the side chains; and Fig. 3 is a side elevation of the device, showing it in the process of being connected to one of the links of one of the side chains.

Referring to the drawing, 1 designates a shoe of usual construction of a pneumatic tire. 2 designates one of the cross members or chains of a tire chain connected to links 3 of the usual circular side chains or members which are located at the sides of the shoe.

At each end of the cross chain, a link 5 may be provided having a stud 7 integral therewith and provided with a head 9.

The device for detachably connecting the cross chain to a side chain, in the present instance of the invention, comprises a wire 11 bent intermediate its ends to present an eye 12 which may embrace the link stud 7. The wire may be formed to present reversely bent arms 13 presenting seats or eyes 15 adapted to receive one of the links 3 of the side chain. The terminal portions 19 of said arms may have a resilient character such that they will tend to incline from said seats toward the shanks of said arms, and close said seats so as to prevent escape of the link 3 therefrom. The tips 21 of said terminal portions may be curved slightly upward away from the shanks of said arms. In the present instance, said terminal portions are reduced in thickness and flattened to contribute to the yielding character thereof. Preferably the portion of the wire forming the seats 15 is of rigid character so as to have adequate strength effectively to resist the pull on the side links 17 and prevent any possibility of pulling the terminal portions 19 up away from the shanks of the arms 13. The terminal portions 19 may extend along the shanks of the arms 13 in side by side relation, and preferably are extended a substantial distance away from the seats 15, thereby tending to prevent escape of the side chain links 3 from their seats. Also, since the terminal portions 19 are inclined with respect to the shanks of said arms, they will prevent the side chain link from moving a substantial distance away from the seats 15 toward the tips 21.

The construction is such that when it is desired to connect a cross chain with the side chains, it is merely necessary to present one of the link sides 23 (Fig. 3) of the side chains against the tips 21 of the resilient portions 19, and to exert a pull which will cause the link to open or press outward the resilient terminal portions 19 away from the shanks of the arms 13 so as to admit the link to its seat 15. Thereupon, the inherent resilience of the terminal portions will cause the same to move toward and into engagement with the shanks of said arms. The stiffness of the terminal portions is sufficient to prevent any possibility of the side chain links 3 from escaping from the device. After the side chain link has been connected to the device as described, and the tire chain is placed in use, the pull on the side chain link will be resisted by the rigid portions of the reverse bends of the wire which form the seats for the link.

Preferably the arms 13 are bent from the eye 12 at an acute angle such that the seats 15 may be in substantial alinement with the stud 7, in order that the pull of the cross chain on the side chain may be exerted in a desirable direction, and this angle may give the device a yielding character which will tend to prevent breakage of the cross chain.

To contribute to the secure retention of the hook device on the stud of the link 5, a bearing member 25 may be mounted on the stud between the link eye 12 and the head of the stud.

To assemble the parts the end 11ª of the link 5 may be entered through the bearing member 25, the hook eye 12 and the end link of the cross chain, and then the end of said link may be bent around to close the link eye.

By my invention there is provided a simple and efficient means whereby the ends of a broken cross chain may be readily detached from the side chains, and a new cross chain may be readily substituted therefor.

What is claimed is:—

1. In a tire chain, the combination of a link having a stud with a head projecting therefrom, and a securing member comprising a wire bent to present an eye to receive said stud, and reversely bent arms disposed side-by-side and having rigid seats to receive and resist the pull of a link of a side chain, said arms having resilient terminal portions gradually reduced in thickness from points adjacent said seats to the ends of said portions, said terminal portions being yieldable to allow insertion of the side chain link between said resilient portions and other portions of said arms into said rigid seats.

2. A device for securing cross members to side members of tire chains comprising a wire bent to present an eye for connection with the cross member of a tire chain, and having a pair of reversely bent arms projecting from said eye and presenting rigid seats for receiving a part of the side member of the chain, said arms having resilient terminal portions of substantial length projecting from points adjacent said rigid seats toward other portions of said arms, and yieldable to admit the side member part into said seats.

3. A device for securing cross members to side members of tire chains comprising a wire formed to present an element for connection with the cross member of the tire chain, said wire having a reverse bend presenting an eye for receiving a part of the side member of the tire chain, and a resilient arm normally closing said eye and yieldable to admit said side member part into said eye.

4. The combination with a cross member of a tire chain, of devices at opposite ends of said cross member for detachably connecting the same to the side members of the tire chain, each of said devices comprising a wire formed to present an element connected to an end of said cross member, said wire having an arm projecting from said element reversely bent to present an eye for receiving a part of the side member, said arm having a resilient portion normally closing said eye and yieldable to admit the side member part into said eye.

5. A securing member comprising a wire bent to present an eye intermediate the ends of the wire, said wire having resilient end portions bent back toward the body of the wire to form an eye in a plane different from the plane of the intermediate eye, said resilient end portions being yieldable relatively to said body to admit an element into the eye formed by said body and resilient end portions.

6. The combination with a link having a stud provided with a head, a bearing member on said stud for engagement with said head, and a securing member comprising a wire bent to present an eye intermediate the ends of the wire for receiving said stud, and resilient end portions bent back toward the body of the wire to form another eye, said end portions being yieldable to admit an element into the latter eye.

7. The combination of a securing member comprising a wire bent to present an eye intermediate the ends of the wire, said wire having a resilient end portion bent back toward the body of the wire to form an eye, said resilient end portion being yieldable relatively to said body to admit an element into the eye formed by said body and resilient end portion, and a link comprising a head and a stud having an end portion entered through said first-named eye and bent back toward the shank of said stud.

In testimony whereof, I have signed my name to this specification.

CHARLES S. BARRELL.